United States Patent
Braatz et al.

(10) Patent No.: US 10,059,564 B2
(45) Date of Patent: Aug. 28, 2018

(54) METHOD FOR DETERMINING MOVING MASS OF A DOOR SYSTEM

(71) Applicant: Siemens Aktiengesellschaft, Munich (DE)

(72) Inventors: Uwe Braatz, Hannover (DE); Uwe Nolte, Barsinghausen (DE)

(73) Assignee: Siemens Aktiengesellschaft, Munich (DE)

( * ) Notice: Subject to any disclaimer, the term of this patent is extended or adjusted under 35 U.S.C. 154(b) by 98 days.

(21) Appl. No.: 15/113,797

(22) PCT Filed: Jan. 15, 2015

(86) PCT No.: PCT/EP2015/050649
§ 371 (c)(1),
(2) Date: Jul. 22, 2016

(87) PCT Pub. No.: WO2015/110341
PCT Pub. Date: Jul. 30, 2015

(65) Prior Publication Data
US 2016/0340149 A1    Nov. 24, 2016

(30) Foreign Application Priority Data

Jan. 27, 2014 (DE) .................. 10 2014 201 399

(51) Int. Cl.
*G01B 3/00* (2006.01)
*G01L 1/00* (2006.01)
(Continued)

(52) U.S. Cl.
CPC .......... *B66B 5/0018* (2013.01); *B66B 13/146* (2013.01); *G01L 1/26* (2013.01)

(58) Field of Classification Search
CPC ....... B66B 13/146; B66B 5/0018; G01L 1/26; G01L 3/00; G01L 5/00
(Continued)

(56) References Cited

U.S. PATENT DOCUMENTS

| 5,274,312 A | 12/1993 | Gerstenkorn |
| 7,637,355 B2 * | 12/2009 | Tyni ..................... B66B 13/143 187/315 |

(Continued)

FOREIGN PATENT DOCUMENTS

| EP | 0 548 505 | 2/1996 |
| EP | 1 529 251 | 5/2005 |

(Continued)

*Primary Examiner* — An Do
(74) *Attorney, Agent, or Firm* — Cozen O'Connor

(57) ABSTRACT

A method for determining moving mass of a door system, actuated by a motor, wherein a) the motor electrical output, which is converted into mechanical output, is measured, b) the electrical output is summed during opening and/or closure, starting from the beginning of the actuation of the mass by the motor from initial rest until an end rest position is reached following completion of the actuation to determine energy losses, c) measurement of the maximum speed of the mass of the door system is measured during opening and/or closure, d) the electrical output provided by the motor from the initial rest position of the mass of the door system until achieving the maximum speed v thereof is summed, and the obtained energy value is reduced by the energy losses occurring up to this time point to determine the mass of the door system from the obtained kinetic energy.

2 Claims, 1 Drawing Sheet

(51) Int. Cl.
 *B66B 5/00* (2006.01)
 *B66B 13/14* (2006.01)
 *G01L 1/26* (2006.01)

(58) Field of Classification Search
 USPC .................................................. 702/33, 41
 See application file for complete search history.

(56) References Cited

U.S. PATENT DOCUMENTS

| | | | |
|---|---|---|---|
| 7,992,687 B2* | 8/2011 | Yumura | B66B 13/26 |
| | | | 187/316 |
| 8,183,815 B2* | 5/2012 | Krause | B66B 13/146 |
| | | | 318/565 |
| 2007/0016332 A1 | 1/2007 | Tyni et al. | |
| 2008/0179143 A1 | 7/2008 | Tyni | |
| 2010/0013425 A1 | 1/2010 | Krause et al. | |

FOREIGN PATENT DOCUMENTS

| | | |
|---|---|---|
| EP | 1 938 160 | 11/2010 |
| WO | WO 2005/073119 | 8/2005 |
| WO | WO 2007/028850 | 3/2007 |

* cited by examiner

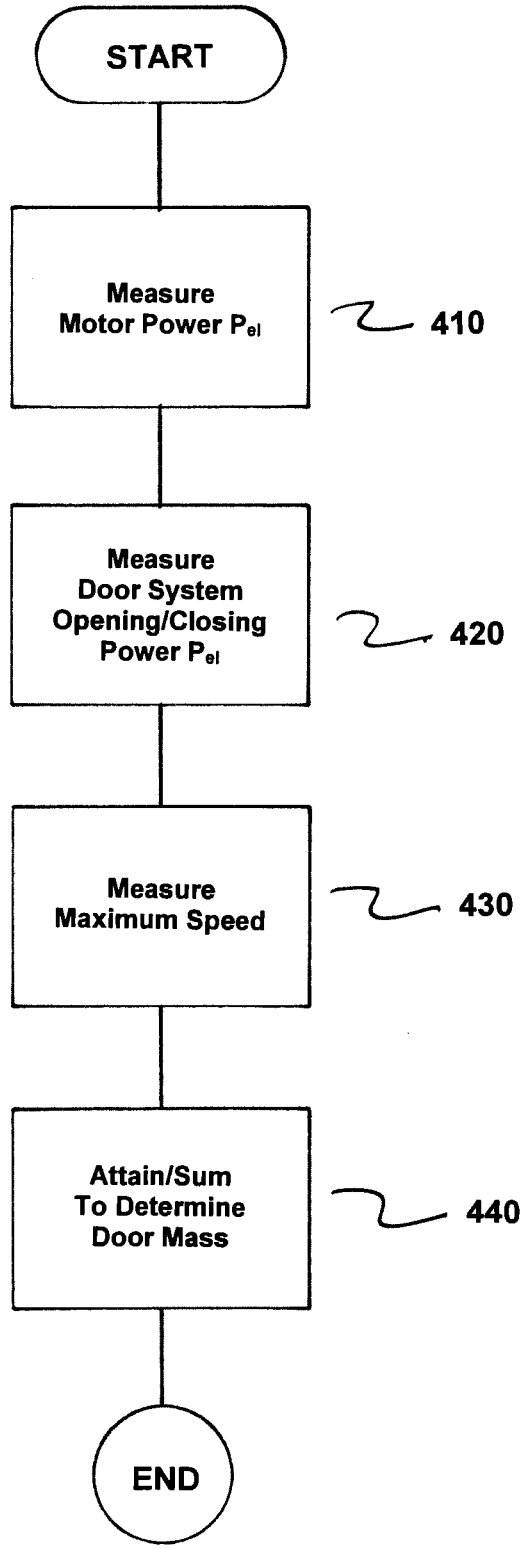

METHOD FOR DETERMINING MOVING MASS OF A DOOR SYSTEM

CROSS-REFERENCE TO RELATED APPLICATIONS

This is a U.S. national stage of application No. PCT/EP2015/050649 filed 15 Jan. 2015. Priority is claimed on German Application No. 10 2014 201 399.2 filed 27 Jan. 2014, the content of which is incorporated herein by reference in its entirety.

BACKGROUND OF THE INVENTION

1. Field of the Invention

The present invention relates to a method for determining the moving mass of an elevator door system driven by a motor.

2. Description of the Related Art

Knowing the moving mass can be of interest in the case of drive tasks, for example, for the following reasons:
a) From safety aspects: for example, in accordance with the EN81 standard, the total kinetic energy of the door as it closes must not exceed either 4J or 10J,
b) for drive system reasons: if, for example, the force transmission must not exceed particular values, the acceleration can be matched to the moving mass,
c) for fault detection: if significant changes in mass arise, this may indicate faulty operating states and
d) for control system reasons: the controller parameters can be matched to the mass to achieve optimum running behavior.

To determine the moving mass, the following exemplary methods are known:
a) Apply a defined force and measure the resultant acceleration,
b) Apply a defined acceleration and measure the force required to produce the acceleration,
c) Apply a defined force for a defined time and measure the resultant speed,
d) Apply a defined voltage ramp and measure the current.

These methods require friction compensation and generally a defined running curve in order to minimize fault effects.

The last mentioned method is disclosed in EP 1 529 251 B1. With this method, the door system is moved by an electric drive device. As a prescribed maximum speed must not be exceeded here, the mass of the door system is automatically determined for configuring the door control unit. For this purpose, the door system is accelerated in a controlled manner during a monitored opening movement and possibly during a subsequent closing movement and then stopped again. The rms motor voltage of the drive device for determining the mass is obtained via the PWM voltage-time surfaces. Difficulties arise, however, as the voltage in the DC link may fluctuate and each output stage has a so-called dead time, i.e., times in which neither of the two transistors is in the on-state. In addition, purely electrical losses also occur in the motor line because of the line and internal resistance. All these effects considerably compromise determination of the power, and make it difficult to determine the mass in a largely automated manner and independently of the running curve.

EP 0 548 505 B1 also discloses a device and method for determining the dynamic mass. Here, however, the door has to be switched to a torque-free state for test purposes. The opening and closing movements required for test purposes are different from opening and closing movements during intended use which are herein referred to as intended opening and closing movements.

SUMMARY OF THE INVENTION

It is an object of the present invention to provide a method for determining a moving mass m of an elevator door system, where the method provides a simple way to determine the moving mass m of the elevation door system.

This and other objects and advantages are achieved in accordance with the invention by a method including:
a) measurement of a the motor's electrical power $P_{el}$ which is converted into mechanical power,
b) the electrical power $P_{el}$ is summed for an intended opening and/or closing movement of the door system from the start of driving of the mass m by the motor from an initial rest position until a final rest position is reached on termination of driving to determine energy losses, e.g., due to friction and/or closing forces,
c) measurement of the maximum speed v of the mass of the door system during the intended opening and/or closing movement of the door system, and
d) the electrical power provided by the motor from the initial rest position of the mass m of the door system to the point in time when its maximum speed v is attained is summed and the thus obtained energy value is reduced by the energy losses that have occurred up to this point in time in order to determine the mass m of the door system from the thus obtained kinetic energy E in accordance with the following relationship:

$$m = \frac{2E}{v^2}.$$

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The FIGURE is a flowchart of the method in accordance with the invention.

DETAILED DESCRIPTION OF THE EXEMPLARY EMBODIMENTS

In accordance with the invention, the method involves permanent summing of the electrical power $P_{el}$ supplied to and consumed by the motor. This enables an energy balance to be drawn at any points in time. By skillfully selecting these instants, the door mass can be determined with automatic compensation of friction and closing forces. In addition, by concatenation of opening and closing movement, the friction and any possible closing force (e.g., due to a spring or a counterweight) can be explicitly calculated.

For determining the mass, the door system is regarded as an energy store, as only the mass m is suitable for storing and delivering energy again during a movement. All the other forces only remove energy from the door system and do not return it again during an opening or closing movement. As the door has the same energy state at the start and at the end (the door is stationary), the resulting energy corresponds to the losses due to friction or rather overcoming the spring force or counterweight. The measured energy summed at the instant of maximum speed v during the movement, i.e., the time integral of the power $P_{el}$ electrically delivered hitherto, corresponds to the present energy sum of the kinetic energy of the mass m and the hitherto required friction and counterweight energy. As the kinetic and friction energy at the end of the movement is known, this can be taken into account pro rata for the intermediate value with maximum speed, directly yielding the kinetic energy within the system. This energy value corresponds to the known relationship:

$$E = \frac{1}{2} \cdot m \cdot v^2,$$ Eq. 1 so that the door mass m can be immediately calculated according to $$m = \frac{2E}{v^2}.$$ Eq. 2

In order to determine the electrical energy, in contrast to the conventional above-described method, instead of the voltage-time surface, the back-EMF $U_{EMK}$ is directly used that results very simply from the current and easily measurable speed $v_{Mot}$ via a proportionality factor $k_v$. The electrical power $P_{el}$ that is converted into mechanical power is obtained from the following relationship:

$$P_{el} = U_{EMK} \cdot I_{Mot}$$ Eq. 3

(motor current: $I_{Mot}$).
Due to the relationship $$U_{EMK} = k_V \cdot v_{Mot}$$ Eq. 4

The factor $k_v$ results from the ratio of the nominal voltage $U_{nom}$ to the idling speed $v_{Mot\_LL}$, i.e., no-load condition, in accordance with the relationship:

$$k_v = \frac{U_{nom}}{v_{Mot\_LL}}$$ Eq. 5 the electrical power can now also be determined via the speed:

$$P_{el} = k_v \cdot v_{Mot} \cdot I_{Mot}$$ Eq. 6

The product of current $I_{Mot}$ and speed $v_{Mot}$ multiplied by a motor constant $k_v$ directly yields the electrical power $P_{el}$ that is converted into mechanical power. The time consuming and error prone compensation of internal resistance, dead time and fluctuating DC-link voltage can thus be eliminated.

In accordance with the method of the invention, the door system is set in motion for the opening or closing process by a motor via a drive belt. The motor current $i_q$ and rotor position $\gamma_{mot}$ are cyclically measured (e.g., in interrupt mode). Although acyclic measurement is also conceivable, the time interval must then likewise be determined.

The rotor speed $\Omega_{mot}$ can be determined from the rotor position $\gamma_{mot}$ by differentiation.

For calculating the energy per cycle, two approaches can be taken:

a) Via current $i_q$, speed $\Omega_{mot}$ and cycle time $\Delta t$ $$\Delta E = k_E \cdot i_q \cdot \Omega_{mot} \cdot \Delta t$$

(Note: $\Delta t$ denotes the cycle time)

b) Via current $i_q$ and rotor position $\gamma_{mot}$:

$$\Delta E = k_t \cdot i_q \cdot \Delta \gamma_{mot}$$

(Note: $\Delta \gamma_{mot}$ denotes the change in the rotor angle in the last cycle $\Delta t$).

The above relationships can be very easily transformed into one another and offer comparable accuracy:

With $$\omega = \frac{\Delta \gamma_{mot}}{\Delta t} \text{ and}$$

$$k_E = k_t = \frac{U}{\omega} = \frac{M}{i_q},$$

the second relationship can be derived directly from the first. Here, U denotes the back-EMF and M the torque. $k_E$ and $k_t$ are constants.

For better understanding of the energy relationships, the entire system can be regarded as an interconnection of two lossless energy stores (toothed belt and door mass), where all the energy losses are attributed to friction.

The mass determination sequence comprises the following steps:

a) Measurement of the motor current $i_q$.
   In the case of DC drives, this is the motor current itself, while for AC drives it is the torque-generating current $i_q$.

b) Measurement of the rotor position $\gamma_{mot}$.
   Different measurements can be obtained depending on the sensor used; the important thing is conversion to the angle in radians ($2\pi$) and taking the difference with respect to the last position.

c) Calculation of the product $i_q \cdot \Delta \gamma_{mot}$ and summation
   The product of motor current $i_q$ and change in rotor position $\Delta \gamma_{mot}$ is proportional to the energy in the cycle. This value is summed and subsequently multiplied by the constant $k_t$.

d) Summation of the angle rotated through $\gamma_{mot,sum}$.
   In parallel with this summation, the distance traveled by the rotor is also summed (summing of the angle).

e) Storing of intermediate values.
   For subsequent calculation of the mass m and the friction, the intermediate results obtained at the instant of maximum door energy, and the total values for opening and closing process, are stored. Also stored are:
   the respective rpm $\Omega_{mot}$,
   the product sum $$\frac{E_{mot,sum}}{k_t} = \sum (i_q \cdot \Delta \gamma_{mot})$$

and
   the rotor angle sum $\gamma_{mot,sum} = \Sigma \Delta \gamma_{mot}$.

f) Storage of end values.
   In addition to the intermediate results in the opening and closing direction, the product and angle sums for the complete opening and closing movement are stored. By definition, the rpm is zero at the end points.

g) Calculation of the friction.

The average friction for the opening and the closing movement is calculated. The lossless energy stores of the overall system again possess identical values at the end positions. Intermediate charges have been equalized again. The energy remaining in the system therefore corresponds precisely to the frictional losses.

Total energy from the product sum:

$$E_{frict,ges} = k_t \cdot \sum_{\gamma=0}^{\gamma=Endpos} (i_q \cdot \Delta\gamma_{mot})$$

The friction torque results from the total energy and the rotor angle covered:

$$M_{frict} = \frac{E_{frict}}{\gamma_{mot,sum}}$$

h) Calculation of the door mass m.

From the product sum stored at the instant of maximum door speed, the energy supplied hitherto can be calculated:

$$E_{sum,zw} = k_t \cdot \sum_{\gamma=0}^{\gamma=Zwischenwet} (i_q \cdot \Delta\gamma_{mot}).$$

Some of this energy was required for overcoming the friction. This energy portion $E_{frict,ges}$ is calculated via the friction torque and the ratio of partial distance $\gamma_{mot,zw}$ to total distance $\gamma_{mot,sum}$:

$$E_{frict,zw} = M_{frict} \cdot \gamma_{mot,zw} = \frac{\gamma_{mot,zw}}{\gamma_{mot,sum}} \cdot E_{frict,ges}.$$

The kinetic energy $E_{door,kin}$ is obtained as the difference between energy supplied $E_{sum,zw}$ and energy lost due to friction $E_{frict,zw}$:

$$E_{door,kin} = E_{sum,zw} - E_{frict,zw} = E_{sum,zw} - \frac{\gamma_{mot,zw}}{\gamma_{mot,sum}} \cdot E_{frict,ges}$$

Door mass m:

$$m = \frac{2 \cdot E_{door,kin}}{(\omega_{mot} \cdot r)^2}$$

(Radius r of the drive shaft for the toothed belt).

In accordance with the disclosed method, after the last equation the mass m of the door system is determined based in each case on an intended opening and/or closing movement. Accordingly, an intended single movement, opening or closing movement, suffices, but the to-be-determined mass m of the door system can also be determined as an average of the results of the two movements. Intended opening and closing movements are defined as opening and closing movements that are not different from opening and closing movements during intended, i.e., normal use.

Markedly different frictional torques during opening and closing indicate an additional system force (e.g., a counterweight or a spring) and/or the efficiency could be direction-dependent.

The "toothed belt" energy store postulated in the system must contain approximately the same energy at all measuring points (at the start, for the intermediate value and at the end position) (or rather the differences must be small compared to the total energy), as otherwise accuracy will suffer.

The method it accordance with the invention can be applied using virtually any running curves. It is merely necessary to ensure that the kinetic energy of the door can be sufficiently clearly differentiated from the frictional energy, as otherwise accuracy will suffer.

The method in accordance with the invention automatically also yields the friction, which is of interest for servicing purposes.

The method in accordance with the invention is relatively robust and provides good repeatability, as it operates in an integrated manner and averages out superimposed noise.

Instead of evaluating the actual speed for the intermediate value, the target speed or a combination of the two could be used.

The FIGURE is a flowchart of the method in accordance with the invention. The method comprises measuring an electrical power $P_{el}$ of the motor which is converted into mechanical power, as indicated in step 410. Next, the electrical power $P_{el}$ for at least one of (i) an intended opening and (ii) intended closing movement of the door system from a start of driving the mass m by the motor from an initial rest position until a final rest position is reached upon termination of driving is summed to determine energy losses, as indicated in step 420.

Next, a maximum speed v of the mass of the door system is measured during at least one of the (i) intended opening and (ii) the intended closing movement of the door system, as indicated in step 430.

The electrical power provided by the motor from the initial rest position of the mass m of the door system to the point at a time when the maximum speed v of the door is attained reducing an obtained energy value by energy losses that have occurred up to this point in time is now attained and summed to determine the mass m of the door system from an obtained kinetic energy E in accordance with the following relationship:

$$m = \frac{2E}{v^2},$$

as indicated in step 440.

While there have been shown, described and pointed out fundamental novel features of the invention as applied to a preferred embodiment thereof, it will be understood that various omissions and substitutions and changes in the form and details of the method described and illustrated, and in their operation, may be made by those skilled in the art without departing from the spirit of the invention. For example, it is expressly intended that all combinations of those method steps which perform substantially the same function in substantially the same way to achieve the same results are within the scope of the invention. Moreover, it should be recognized that method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for determining a moving mass m of an elevator door system driven by a motor to automatically compensate for at least one of frictional forces and closing forces associated with the door system, the method comprising:
   a) measuring an electrical power of the motor which is converted into mechanical power;
   b) summing the electrical power for at least one of (i) an intended opening and (ii) intended closing movement of the door system from a start of driving the mass m by the motor from an initial rest position until a final rest position is reached upon termination of driving to determine energy losses;
   c) measuring a maximum speed v of the mass of the door system during at least one of the (i) intended opening and (ii) the intended closing movement of the door system; and
   d) attaining and summing the electrical power provided by the motor from the initial rest position of the mass m of the door system to a point in time at which the maximum speed v of the door system is attained and reducing an obtained energy value by energy losses that have occurred up to this point in time to determine the mass m of the door system from an obtained kinetic energy E to automatically compensate for at least one of the frictional forces and closing forces associated with the door system;
   wherein the mass of the door system is determined in accordance with the following relationship:

$$m = \frac{2E}{v^2}.$$

2. The method of claim 1, wherein the energy losses are due to at least one of the frictional forces and the closing forces.

* * * * *